(12) United States Patent
Wang et al.

(10) Patent No.: US 9,525,966 B2
(45) Date of Patent: Dec. 20, 2016

(54) CENTRAL SCHEDULING MULTI-BOARD ARCHITECTURE FOR WIRELESS TRANSCEIVER STATION

(71) Applicants: Jerry Z. Wang, Marlboro, NJ (US); Venkata Vankayala, Guntur (IN); Ramdhan Singh, Bangalore (IN); Constant Conan, Perros-Guirec (FR); Taofik Saidi, Saint Michel en Greve (FR); Suresh Gopinathan, Bangalore (IN)

(72) Inventors: Jerry Z. Wang, Marlboro, NJ (US); Venkata Vankayala, Guntur (IN); Ramdhan Singh, Bangalore (IN); Constant Conan, Perros-Guirec (FR); Taofik Saidi, Saint Michel en Greve (FR); Suresh Gopinathan, Bangalore (IN)

(73) Assignee: Alcatel Lucent, Boulogne-Billancourt (FR)

( * ) Notice: Subject to any disclaimer, the term of this patent is extended or adjusted under 35 U.S.C. 154(b) by 84 days.

(21) Appl. No.: 14/264,472

(22) Filed: Apr. 29, 2014

(65) Prior Publication Data

US 2015/0312932 A1 Oct. 29, 2015

(51) Int. Cl.
*H04M 1/00* (2006.01)
*H04W 4/02* (2009.01)
(52) U.S. Cl.
CPC ..................................... *H04W 4/02* (2013.01)

(58) Field of Classification Search
CPC ............... H04W 52/0206; H04W 88/08; H04L 27/2601; H04L 5/023
USPC ..................................................... 455/561, 17
See application file for complete search history.

(56) References Cited

U.S. PATENT DOCUMENTS

| 6,587,448 B1 * | 7/2003 | Dajer et al. ................... 370/335 |
| 2002/0123365 A1 * | 9/2002 | Thorson et al. .............. 455/524 |
| 2010/0014604 A1 | 1/2010 | Motoyoshi |
| 2010/0067599 A1 | 3/2010 | Dayal et al. |

OTHER PUBLICATIONS

U.S. Office Action issued in U.S. Appl. No. 14/270,695, dated Dec. 4, 2015.

* cited by examiner

*Primary Examiner* — Tu X Nguyen
(74) *Attorney, Agent, or Firm* — Harness, Dickey & Pierce, P.L.C.

(57) ABSTRACT

A transceiver station provides wireless resources for cells on a plurality of carriers in a geographical coverage area, where the geographical coverage area is divided into a plurality of sectors. The transceiver station includes a first board and a second board. The first board includes a L1 processing circuit configured to perform L1 processing functions on at least one of radio frequency antenna streams and downlink transmit data for users in the cells on a per-carrier basis. The second board includes a scheduler configured to schedule at least one of uplink and downlink transmissions for the cells on a per-sector basis, the second board being separate from, but interconnected with the first board.

18 Claims, 7 Drawing Sheets

CENTRAL SCHEDULING MULTI-BOARD ARCHITECTURE FOR WIRELESS TRANSCEIVER STATION

BACKGROUND

Wireless technology standards, such as $3^{rd}$ Generation, $4^{th}$ Generation and $5^{th}$ Generation standards, adopt new technologies, add new features, and increase data rates much faster than actual hardware developments and deployments. As a result, the capacity of a NodeB (or base station) platform (e.g., a hardware board such as a modem board) fills up quickly. This reduces the life cycle of a platform, which then requires more frequent development of new platforms. However, such development not only increases costs, but may delay product delivery time.

Conventionally, L1/L2 processing boards (also referred to as modem boards) at a NodeB utilize a single-board architecture (SBA). In this conventional architecture, each board is connected to all antennas, and performs both L2 scheduling and L1 processing for all cells in the NodeBs coverage area. As a result, all 3GPP standard features are implemented on each board. This "one board for all" solution shortens the life cycle of the boards and limits the ability for additional 3GPP features to be added to the boards.

SUMMARY

At least some example embodiments provide a multi-board architecture (MBA) for L1/L2 processing boards at a base station. According to at least some example embodiments, multiple L1/L2 processing boards at a NodeB are viewed together as a system, thereby distributing radio-frequency (RF) antenna streams and Third Generation Partnership Project (3GPP) feature sets among multiple L1/L2 processing boards at the NodeB. As discussed herein, a NodeB may also be referred to as a transceiver station.

According to at least some example embodiments, different L1/L2 processing boards may be connected to different antenna sets, and different L1/L2 processing boards may be associated with and/or configured to perform different 3GPP features.

The multi-board architecture according to one or more example embodiments reduces unnecessary resource consumption at NodeBs by decreasing duplicated functionality present in the conventional single board architecture. In one example, the L1/L2 processing boards process only a portion or fraction of the antenna streams as compared to the conventional single board architecture.

At least one example embodiment provides a transceiver station providing wireless resources for cells on a plurality of carriers in a geographical coverage area, the geographical coverage area being divided into a plurality of sectors. The transceiver station may include a first board and a second board interconnected with the first board. The first board includes: a first L1 processing circuit configured to perform L1 processing functions on at least one of radio frequency antenna streams and downlink transmit data for users in cells on only a first subset of the plurality of carriers; and a first scheduler configured to schedule at least one of uplink and downlink transmissions for cells on the plurality of carriers in only a first subset of the plurality of sectors. The second board includes: a second L1 processing circuit configured to perform L1 processing functions on at least one of radio frequency antenna streams and downlink transmit data for users in cells on only a second subset of the plurality of carriers; and a second scheduler configured to schedule at least one of uplink and downlink transmissions for cells on the plurality of carriers in only a second subset of the plurality of sectors.

According to at least some example embodiments, the first scheduler may be further configured to: generate downlink scheduling information for cells on the plurality of carriers in only the first subset of the plurality of sectors; and output the downlink scheduling information and scheduled downlink transmission data to the second L1 processing circuit. The second L1 processing circuit may be further configured to: generate at least one radio frequency antenna stream based on the downlink scheduling information and the scheduled downlink transmission data; and output the generated at least one radio frequency antenna stream to a radio frequency antenna for transmission to users in cells on only the second subset of the plurality of carriers.

The first L1 processing circuit may be further configured to: obtain uplink control and transmit data for users in cells on only the first subset of the plurality of carriers based on the radio frequency antenna streams; and output the obtained uplink control and transmit data to the second scheduler. The second scheduler may be configured to: collect uplink control and transmit data for users in cells in only the second subset of the plurality of sectors, the collected uplink control and transmit data including the obtained uplink control and transmit data output from the first L1 processing circuit; generate uplink control and transmit information for the cells in only the second subset of the plurality of sectors; and output the generated uplink scheduling information to a radio network controller.

The first subset of the plurality of carriers may be different from the second subset of the plurality of carriers. The first subset of the plurality of sectors may be different from the second subset of the plurality of sectors.

The first scheduler may include: an anchor cell scheduler configured to schedule at least one of uplink and downlink transmissions for cells on the first subset of the plurality of carriers in the first subset of the plurality of sectors; and a secondary scheduler configured to schedule at least one of uplink and downlink transmissions for cells on the second subset of the plurality of carriers in the first subset of the plurality of sectors.

Each carrier in the first subset of the plurality of carriers may be different from each carrier in the second subset of the plurality of carriers. Each sector in the first subset of the plurality of sectors may be different from each sector in the second subset of the plurality of sectors.

At least one other example embodiment provides a transceiver station providing wireless resources for cells on a plurality of carriers in a geographical coverage area, the geographical coverage area being divided into a plurality of sectors. The transceiver station includes: a first board including a L1 processing circuit configured to perform L1 processing functions on at least one of radio frequency antenna streams and downlink transmit data for users in the cells on a per-carrier basis; and a second board including a scheduler configured to schedule at least one of uplink and downlink transmissions for the cells on a per-sector basis. The second board is separate from, but interconnected with the first board.

The L1 processing circuit may be further configured to perform L1 processing functions on at least one of the radio frequency antenna streams and the downlink transmit data for users in cells on only a first subset of the plurality of carriers. The scheduler may be configured to schedule at least one of uplink and downlink transmissions for users in cells on the plurality of carriers in only a first subset of the plurality of sectors.

The scheduler may be further configured to: generate downlink scheduling information for the users in the cells in only the first subset of the plurality of sectors; and output the downlink scheduling information and scheduled downlink transmission data to the L1 processing circuit. The L1 processing circuit may be further configured to: generate at least one radio frequency antenna stream based on the downlink scheduling information and the scheduled downlink transmission data; and output the generated at least one radio frequency antenna stream to a radio frequency antenna for transmission to the users in the cells on only the first subset of the plurality of carriers.

The L1 processing circuit may be further configured to: obtain uplink control and transmit data for the users in the cells on only the first subset of the plurality of carriers based on the radio frequency antenna streams; and output the obtained uplink control and transmit data to the scheduler. The scheduler may be configured to: collect uplink control and transmit data for the users in the cells in only the first subset of the plurality of sectors, the collected uplink control and transmit data including the obtained uplink control and transmit data; generate uplink control and transmit information for the cells in only the first subset of the plurality of sectors; and output the generated uplink control and transmit information to a radio network controller.

The scheduler may include: an anchor cell scheduler configured to schedule at least one of uplink and downlink transmissions for the cells on the first subset of the plurality of carriers in the first subset of the plurality of sectors; and a secondary scheduler configured to schedule at least one of uplink and downlink transmissions for cells on a second subset of the plurality of carriers in the first subset of the plurality of sectors.

At least one other example embodiment provides a method for scheduling transmissions at a transceiver station providing wireless resources for cells on a plurality of carriers in a geographical coverage area, the geographical coverage area being divided into a plurality of sectors, the method comprising: performing, at a first board at the transceiver station, L1 processing functions on at least one of radio frequency antenna streams and downlink transmit data for users in the cells on a per-carrier basis; and scheduling, at a second board at the transceiver station, at least one of uplink and downlink transmissions for the cells on a per-sector basis.

The performing step may include: performing L1 processing functions on at least one of the radio frequency antenna streams and the downlink transmit data for users in cells on only a first subset of the plurality of carriers. The scheduling step may include: scheduling at least one of uplink and downlink transmissions for users in cells on the plurality of carriers in only a first subset of the plurality of sectors.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
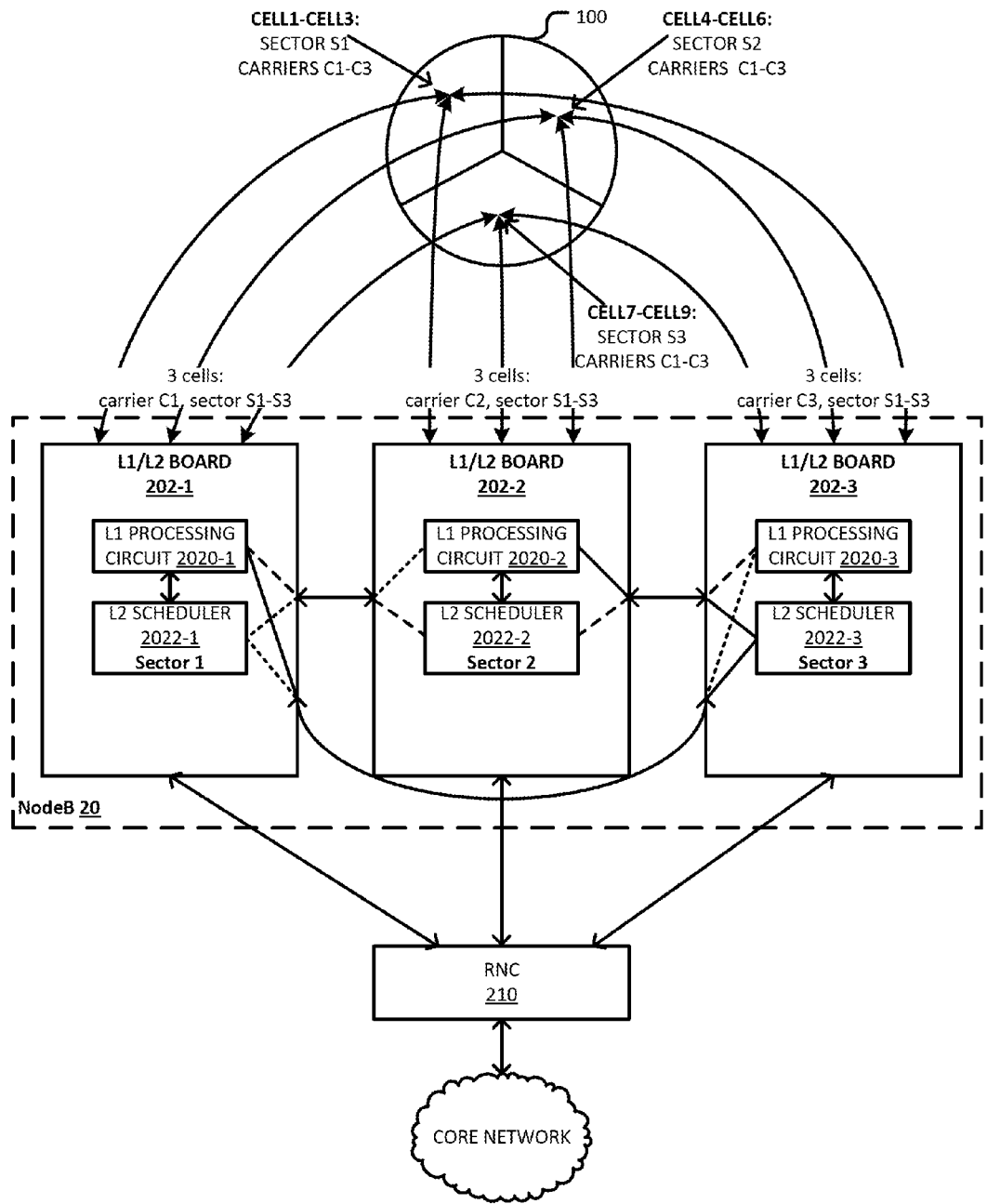
FIG. 1 illustrates a portion of a wireless communications network including a NodeB having a multi-board architecture (MBA) according to an example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing base stations, NodeBs, eNodeBs, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "NodeB" may be considered synonymous to, and may hereafter be occasionally referred to as a Node B, base station, transceiver station, base transceiver station (BTS), etc., and describes a transceiver in communication with and providing wireless resources to users in a geographical coverage area. As discussed herein, NodeBs may have all functionally associated with conventional, well-known base stations in addition to the capability and functionality to perform the methods discussed herein.

For the sake of simplicity, the term NodeB may be used to represent a NodeB for $3^{rd}$ Generation Wideband Code Division Multiple Access (WCDMA), an eNodeB for 4th Generation Long Term Evolution (LTE), and a general base station for other wireless systems such as Code Division Multiple Access (CDMA), Worldwide Interoperability for Microwave Access (WiMax), undergoing 5th Generation systems, etc.

The term "user" as discussed herein, may be considered synonymous to, and may hereafter be occasionally referred to, as a user equipment ("UE"), client, mobile unit, mobile station, mobile user, mobile, subscriber, user, remote station, access terminal, receiver, etc., and describes a remote user of wireless resources in a wireless communication network.

As discussed herein, uplink or reverse link transmissions refer to transmissions from user to NodeB (or network), whereas downlink or forward link transmissions refer to transmissions from NodeB (or network) to user.

A carrier refers to a frequency bandwidth for a user. In a Wideband Code Division Multiple Access (WCDMA) network, a carrier is 5 MHz frequency bandwidth. In a Third Generation Partnership Project Long Term Evolution (3GPP LTE) network, a carrier may be 1.4 MHz, 3 MHz, 5 MHz, 10 MHz, 15 MHz or 20 MHz.

As described herein, L1 refers to Layer 1, L2 refers to layer 2, and a "board" or "processing board" refers to a L1/L2 baseband processing board.

Although example embodiments will be discussed herein with regard to a geographical coverage area divided into 3 sectors and having 3 carriers and a total of 9 cells, it should be understood that example embodiments also apply to any number of carriers, any number of sectors per carrier, any number of cells, and any number of antennas per carrier.

Although example embodiments are discussed herein with regard to WCDMA and LTE, example embodiments may also be applied to other wireless technologies and systems such as CDMA, WiMAX, undergoing 5G, etc.

FIG. 1 illustrates a portion of a wireless network including a NodeB having a multi-board architecture (MBA) according to an example embodiment.

Referring to FIG. 1, the NodeB 20 serves users (not shown) in a geographical coverage area 100. The NodeB 20 is communicatively coupled to a radio network controller (RNC) 210. The RNC 210 is further coupled to a core network.

The RNC 210 carries out radio resource management as well as mobility management functions in the network. The RNC 210 also controls the NodeB 20. The RNC 210 sends and receives information from the core network as well as the eNodeB 20. Because RNCs and their functionality are generally well-known, a further detailed description of RNC 210 is omitted.

Still referring to FIG. 1, the NodeB 20 includes a plurality of L1/L2 processing boards 202-1, 202-2 and 202-3. The L1/L2 processing boards 202-1, 202-2 and 202-3 are operatively coupled to one another so as to exchange information with one another. The L1/L2 processing boards 202-1, 202-2 and 202-3 are separate from, but interconnected with, one another at the NodeB 20.

In one example, the L1/L2 processing boards 202-1, 202-2 and 202-3 exchange L1/L2 interface messages. In one example, L1/L2 interface messages may include: cell and user configuration packets sent from L2 schedulers to L1 processing circuits; downlink data packets sent from L2 schedulers to L1 processing circuits; downlink control packets sent from L2 schedulers to L1 processing circuits; uplink Channel Quality Indicator (CQI) and Ack/Nack information packets decoded by L1 processing circuits and sent from the L1 processing circuits to L2 schedulers, etc.

Figure 2:
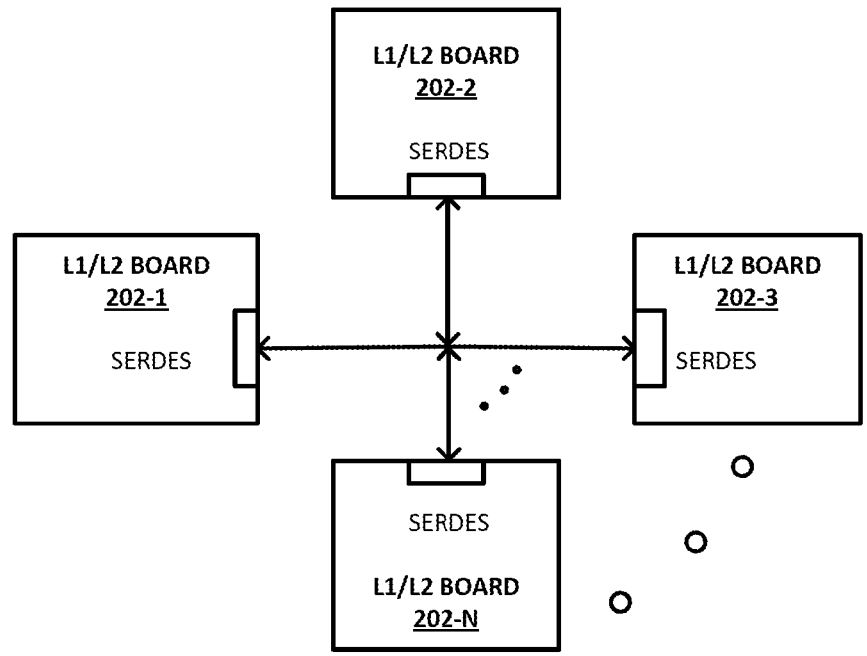
FIGS. 2 and 3 illustrate example interconnection configurations of L1/L2 processing boards at a NodeB.
Figure 3:
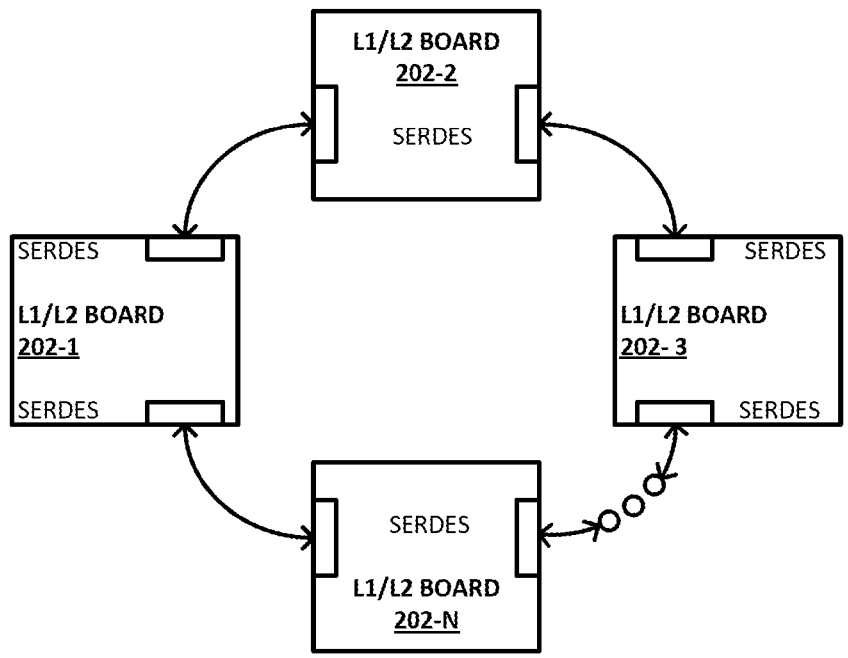

The L1/L2 processing boards 202-1, 202-2 and 202-3 shown in FIG. 1 may be coupled to one another in various ways. FIGS. 2 and 3 illustrate example configurations for inter-board links between N L1/L2 processing boards at a NodeB, such as NodeB 20. In the example embodiment shown in FIG. 1, N=3. However, example embodiments are not limited to this example.

In more detail, FIG. 2 illustrates a star topology for connecting N L1/L2 processing boards 202-1, 202-2, 202-3, . . . , 202-N. In the example shown in FIG. 2, each L1/L2 processing board has a single serializer/deserializer (SERDES) I/O port for exchanging information with other L1/L2 processing boards.

FIG. 3 illustrates a ring topology for interconnecting the N L1/L2 processing boards 202-1, 202-2, 202-3, . . . , 202-N. In this example, each L1/L2 processing board has 2 SERDES I/O ports exchanging information with other L1/L2 processing boards.

In the example configurations shown in FIGS. 2 and 3, each of the interconnection configurations utilizes a high speed SERDES physical link, such as a serial RapidIO (sRIO) industry standard link. However, example embodiments should not be limited to these examples.

Although only ring and star topologies are discussed herein, the L1/L2 processing boards may be interconnected using any suitable interconnection topology.

Returning to FIG. 1, the L1/L2 processing board 202-1 includes a L1 processing circuit 2020-1 operatively coupled to a L2 scheduler 2022-1. The L1/L2 processing board 202-2 includes a L1 processing circuit 2020-2 operatively coupled to a L2 scheduler 2022-2. The L1/L2 processing board 202-3 includes a L1 processing circuit 2020-3 operatively coupled to a L2 scheduler 2022-3.

According to example embodiments, the L1 processing circuits and/or the L2 schedulers may be hardware, firmware, hardware executing software or any combination thereof. When the L1 processing circuits and/or the L2 schedulers are hardware, such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions of the L1 processing circuits and/or the L2 schedulers. CPUs, SOCs, DSPs, ASICs and FPGAs may generally be referred to as processors and/or microprocessors.

As discussed herein, the L1 processing circuits may be described as local or remote relative to a given L1/L2 processing board. For example, the L1 processing circuit 2020-1 may be referred to as a local L1 processing circuit relative to the L1/L2 processing board 202-1, but as a remote L1 processing circuit relative to the L1/L2 processing boards 202-2 and 202-3. Similarly, the L2 scheduler circuits may be described as local or remote relative to a given L1/L2 processing board. For example, the L2 scheduler 2022-1 may be referred to as a local L2 scheduler relative to the L1/L2 processing board 202-1, but as a remote L2 scheduler relative to the L1/L2 processing boards 202-2 and 202-3.

As mentioned above, the L1/L2 processing boards 202-1, 202-2, and 202-3 are interconnected with one another. In this regard, each L1 processing circuit is operatively connected to each L2 scheduler, and each L2 scheduler is operatively coupled to each L1 processing circuit.

For example, L1 processing circuit 2020-1 is operatively coupled to local L2 scheduler 2022-1 as well as remote L2 schedulers 2022-2 and 2022-3. L1 processing circuit 2020-2 is operatively coupled to local L2 scheduler 2022-2 as well as remote L2 schedulers 2022-1 and 2022-3. L1 processing circuit 2020-3 is operatively coupled to local L2 scheduler 2022-3 as well as remote L2 schedulers 2022-1 and 2022-2.

Example operation of the L1/L2 processing boards 202-1, 202-2 and 202-3 as well as the components thereof will be discussed in more detail below with regard to FIGS. 5-8.

As mentioned above, simplification and clarity of description, example embodiments will be described with regard to the NodeB 20 being configured for 3 carriers (C1, C2, C3) within the geographical coverage area 100, 3 sectors (S1, S2, S3) per carrier, and 2 antennas per carrier.

In this example, the geographical coverage area 100 includes 9 radio-frequency (RF) cells (CELL1-CELL9) that are divided into 3 groups based on sector and carrier. RF cells CELL1-CELL3 are in sector S1, RF cells CELL4-CELL6 are in sector S2, and RF cells CELL7-CELL9 are in sector S3.

Further, although example embodiments are described with regard to 3 sectors (S1, S2, S3), each of sectors S1, S2, and S3 may represent a subset of sectors, where each subset includes one or more sectors. In this example, each subset of sectors may be different, and more particularly, each sector in one subset of sectors may be different from the sectors in a second subset of sectors. Similarly, although example embodiments are described with regard to 3 carriers (C1, C2, C3), each of carriers C1, C2, and C3 may represent a subset of carriers, where each subset includes one or more carriers. In this example, each subset of carriers may be different, and more particularly, each carrier in one subset of carriers may be different from the carriers in a second subset of carriers.

As mentioned above, the NodeB 20 has 2 RF antennas per carrier. In the example discussed above, the two RF antennas for carrier C1 are connected to L1/L2 processing board 202-1; the two RF antennas for carrier C2 are connected to L1/L2 processing board 202-2; and the two antennas for carrier C3 are connected to L1/L2 processing board 202-3. As a result, the 9 cells CELL1-CELL9 provided by the NodeB 20 are distributed among the 3 L1/L2 processing boards 202-1, 202-2, and 202-3. In this example, the cells are distributed evenly among the L1/L2 processing boards 202-1, 202-2 and 202-3. However, it should be understood that example embodiments are not limited to this even distribution.

According to at least some example embodiments, each L1/L2 processing board performs L1 processing for uplink and downlink transmissions within cells on a per carrier basis, whereas each L1/L2 processing board performs L2 scheduling for uplink and downlink transmissions in cells on a per-sector basis.

In more detail, for example, the L1/L2 processing board 202-1 performs L1 processing for cells CELL1, CELL4, CELL7 of carrier C1; the L1/L2 processing board 202-2 performs L1 processing for cells CELL2, CELL5, CELL8 on carrier C2; and the L1/L2 processing board 202-3 performs L1 processing for cells CELL3, CELL6, CELL9 on carrier C3.

The L1/L2 processing board 202-1 performs L2 scheduling operations for cells CELL1-CELL3 in sector S1; the L1/L2 processing board 202-2 performs L2 scheduling operations for cells CELL4-CELL6 in sector S2; and the L1/L2 processing board 202-3 performs L2 scheduling operations for cells CELL7-CELL9 in sector S3.

When configured in the manner described above, resource consumption of each L1/L2 processing board at the NodeB 20 is reduced from processing 9 cells in connection with the conventional single board architecture (SBA) to 3 cells according to example embodiments.

Figure 4:
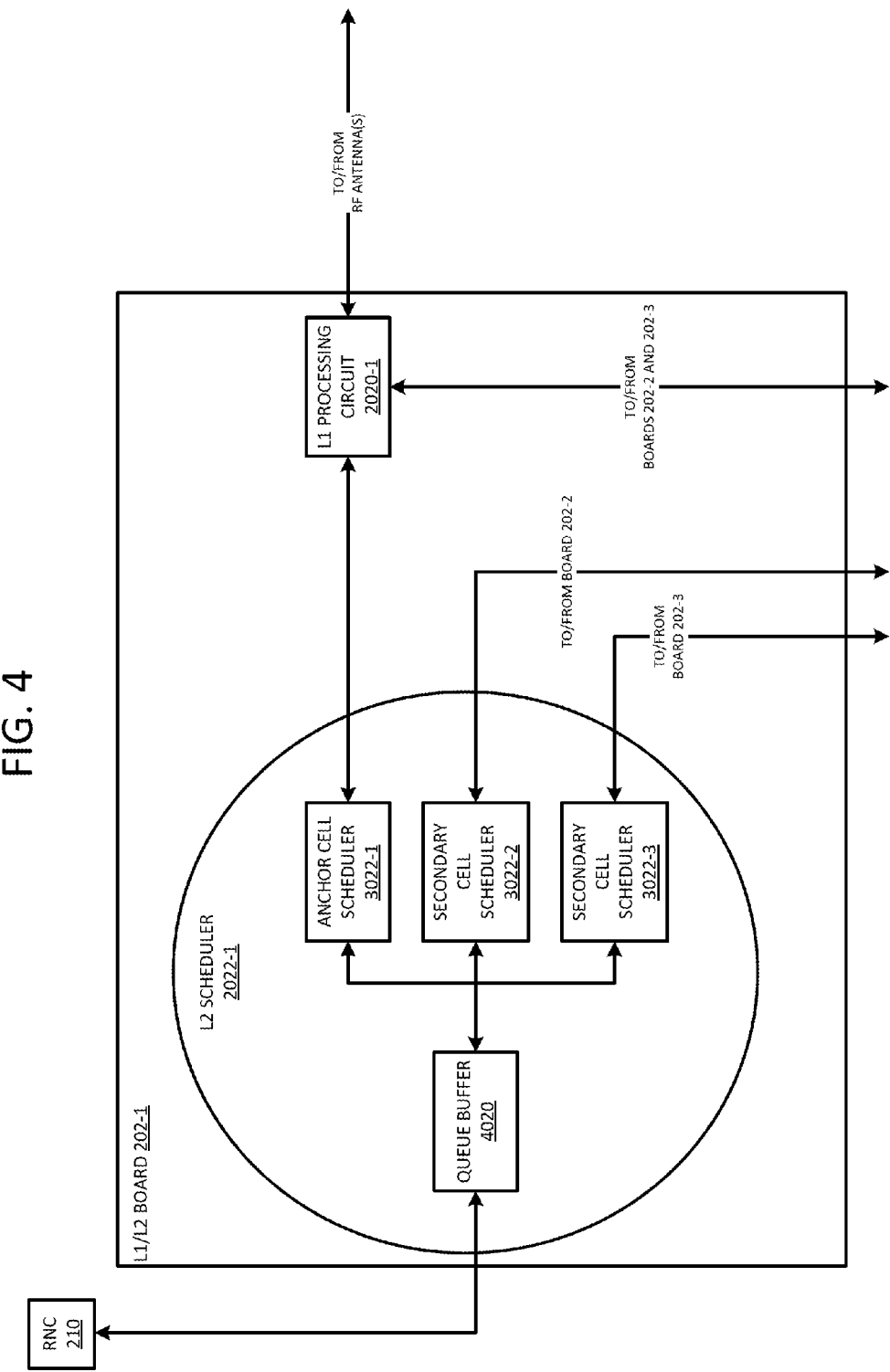
FIG. 4 is a block diagram illustrating an example embodiment of a L1/L2 processing board in more detail.

FIG. 4 is a block diagram illustrating an example embodiment of the L1/L2 processing board 202-1. The block diagram in FIG. 4 shows the L2 scheduler 2022-1 in more detail. Although only the L2 scheduler 2022-1 will be described in more detail with regard to FIG. 4, each of the L2 schedulers 2022-2 and 2022-3 may include the same or substantially the same components, and may operate in the same or substantially the same manner.

Referring to FIG. 4, the L2 scheduler 2022-1 includes a queue buffer 4020 operatively coupled to the RNC 210. The queue buffer 4020 is also operatively coupled to an anchor cell scheduler 3022-1, a first secondary cell scheduler 3022-2 and a second secondary cell scheduler 3022-3.

The anchor cell scheduler 3022-1 is operatively coupled to the local L1 processing circuit 2020-1.

The first secondary cell scheduler 3022-2 is configured to exchange L1/L2 interface messages with the L1/L2 processing board 202-2, and the second secondary cell scheduler 3022-3 is configured to exchange L1/L2 interface messages with the L1/L2 processing board 202-3.

Still referring to FIG. 4, the L1 processing circuit 2020-1 is configured to exchange L1/L2 interface messages with the remote L1/L2 processing boards 202-2 and 202-3.

Example operation of the L1/L2 processing board 202-1 and components thereof will now be described in more detail below with regard to FIGS. 5-8.

Figure 5:
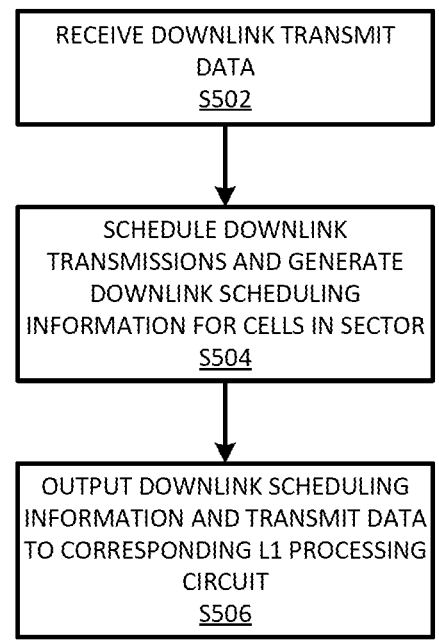
FIGS. 5 and 6 illustrate a method for scheduling downlink transmissions according to an example embodiment.
Figure 6:
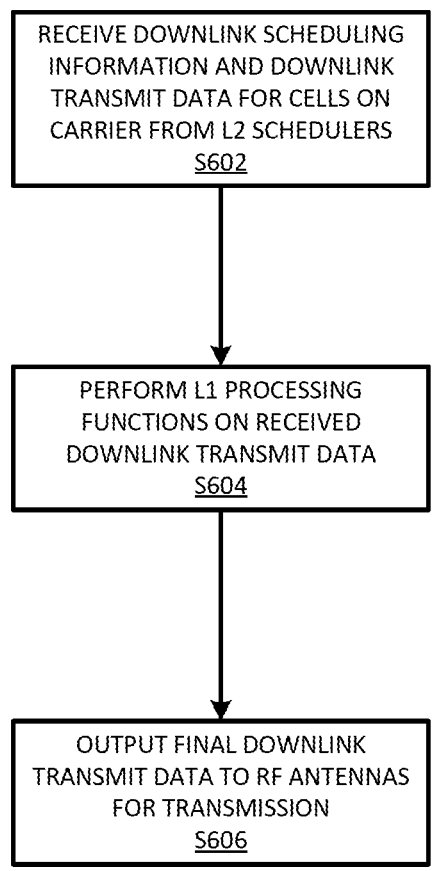

FIGS. 5 and 6 are flow charts illustrating a method for scheduling downlink transmissions according to an example embodiment. FIGS. 5 and 6 also describe example functionality/operation of the L1/L2 processing board 202-1 shown in FIGS. 1 and 4 when the data transmission flow is in the downlink direction (i.e., from NodeB to user).

Referring to FIG. 5, at step S502 the L1/L2 processing board 202-1 receives downlink transmit data from the RNC 210. The received downlink transmit data is buffered in the queue buffer 4020. The queue buffer 4020 then outputs the downlink transmit data to one of the anchor cell scheduler 3022-1, the first secondary cell scheduler 3022-2 and the second secondary cell scheduler 3022-3 based on the cell in which the transmit data is destined. For example, downlink transmit data intended for users in cell CELL1 is output to the anchor cell scheduler 3022-1, downlink transmit data intended for users in cell CELL2 is output to the first secondary cell scheduler 3022-2, and downlink transmit data intended for users in cell CELL3 is output to the second secondary cell scheduler 3022-3.

At step S504, the L2 scheduler 2022-1 schedules downlink data transmissions for all carriers in the cells in sector S1. In so doing, the anchor cell scheduler 3022-1 schedules downlink data transmissions for cell CELL1, the first secondary cell scheduler 3022-2 schedules downlink data transmissions for cell CELL2, and the second secondary cell scheduler 3022-3 schedules downlink data transmissions for cell CELL3 such that downlink data transmissions are scheduled for all carriers in sector S1.

In more detail, for example, the L2 scheduler 2022-1 allocates resources for each user in sector S1. In so doing, the L2 scheduler 2022-1 performs functions such as: adding and removing downlink channels; determining time windows for transmitting downlink channels to users; maintaining power balance by calculating proper/appropriate transmitting power for each channel to reach higher signal-to-noise (SNR) and lower interference to other channels and/or other users; scheduling a re-transmission if a Nack signal is detected for a last transmission, etc. Within the L2 scheduler 2022-1, the anchor cell scheduler 3022-1, the first secondary cell scheduler 3022-2, and the second secondary cell scheduler 3022-3 perform these functions for their respective cells.

At step S506, the L2 scheduler 2022-1 outputs downlink scheduling information and the scheduled downlink transmission data for the cells (and carrier) to (e.g., only to) an appropriate L1 processing circuit. The downlink scheduling information may also be referred to as downlink control information, and may include one or more downlink control packets. The one or more downlink control packets may include user/cell configuration information, downlink control information, which provides timing information, control signal information, channel format information, and transmitter parameters for transmission on the downlink. The downlink data packet is organized into one or multiple transmit blocks with messages to be sent to a user. The scheduled downlink transmission data may include one or more downlink data packets. The one or more downlink data packets carry payload data for delivery to, for example, a destination user.

In more detail, at step S506 the anchor cell scheduler 3022-1 outputs the downlink scheduling information and the scheduled downlink transmission data for cell CELL1 to the local L1 processing circuit 2020-1. The first secondary cell scheduler 3022-2 outputs the downlink scheduling information and the scheduled downlink transmission data for cell CELL2 to the remote L1 processing circuit 2020-2 at remote the L1/L2 processing board 202-2. The second secondary cell scheduler 3022-3 outputs downlink scheduling information and the scheduled downlink transmission data for cell CELL3 to the remote L1 processing circuit 2020-3 at the remote L1/L2 processing board 202-3.

In a more specific example, the anchor cell scheduler 3022-1 sends one or more downlink control packets and one or more downlink data packets for users in cell CELL1 to the local L1 processing circuit 2020-1. The first secondary cell scheduler 3022-2 sends one or more downlink control packets and one or more downlink data packets for users in cell CELL2 to the remote L1 processing circuit 2020-2. The second secondary cell scheduler 3022-3 sends one or more downlink control packets and one or more downlink data packets for users in CELL3 to the remote L1 processing circuit 2020-3.

Although not specifically discussed herein, each of the L2 schedulers 2022-2 and 2022-3 operates in the same or substantially the same manner as discussed above with regard to FIG. 5.

For example, at step S504 the L2 scheduler 2022-2 at the L1/L2 processing board 202-2 schedules downlink data transmissions for cells in sector S2, and the L2 scheduler 2022-3 at the L1/L2 processing board 202-3 schedules downlink data transmissions for cells in sector S3. Then, at step S506, the L2 scheduler 2022-2 outputs downlink scheduling information and the scheduled downlink transmission data for cell CELL4 to the L1 processing circuit 2020-1, outputs the downlink scheduling information and the scheduled downlink transmission data for cell CELL5 to the L1 processing circuit 2020-2, and outputs downlink scheduling information and the scheduled downlink transmission data for cell CELL6 to the L1 processing circuit 2020-3.

Turning now to FIG. 6, at step S602 the L1 processing circuit 2020-1 receives the downlink scheduling information and transmit data for cell CELL1 (on carrier C1) from the anchor cell scheduler 3022-1, the L1 processing circuit 2020-1 receives the downlink scheduling information and transmit data for cell CELL4 (on carrier C1) from L2 scheduler 2022-2 at the remote L1/L2 processing board 202-2, and the L1 processing circuit 2020-1 receives the downlink scheduling information and transmit data for cell CELL7 (on carrier C1) from the L2 scheduler 2022-3 at the remote L1/L2 processing board 202-3.

At step S604, the L1 processing circuit 2020-1 performs L1 processing functions on received downlink transmit data for users in cells CELL1, CELL4 and CELL7 (on carrier C1) to generate a RF stream to be transmitted to users in cells CELL1, CELL4 and CELL7 (on carrier C1). More specifically, at step S604, based on the received downlink scheduling information, the L1 processing circuit 2020-1 further encodes the received downlink data packets and modulates the encoded data into a RF stream.

At step S606, the L1 processing circuit 2020-1 outputs the RF stream (also referred to herein as final downlink transmit data) to the 2 RF antennas coupled to the L1/L2 processing board 202-1 for transmission to the users in cells CELL1, CELL4 and CELL7 (on carrier C1).

The final downlink transmit data is then transmitted to users in cells CELL1, CELL4 and CELL7 on carrier C1.

Although not specifically discussed herein, each of the L1 processing circuits 2020-2 and 2020-3 operates in the same or substantially the same manner as discussed above with regard to FIG. 6.

For example, the L1 processing circuit 2020-2 performs L1 processing functions on received downlink transmit data for users in cells CELL2, CELL5 and CELL8 (on carrier C2) to generate final downlink transmit data to be transmitted to users in cells CELL2, CELL5 and CELL8 (on carrier C2), and the L1 processing circuit 2020-3 performs L1 processing functions on received downlink transmit data for users in cells CELL3, CELL6 and CELL9 (on carrier C3) to generate final downlink transmit data to be transmitted to users in cells CELL3, CELL6 and CELL9 (on carrier C3). Then, at step S606, the L1 processing circuit 2020-2 outputs the final downlink transmit data to the 2 RF antennas coupled to the L1/L2 processing board 202-2 for transmission to the users in cells CELL2, CELL5 and CELL8 (on carrier C2), and L1 processing circuit 2020-3 outputs the final downlink transmit data to the 2 RF antennas coupled to the L1/L2 processing board 202-3 for transmission to the users in cells CELL3, CELL6 and CELL9 (on carrier C3).

Figure 7:
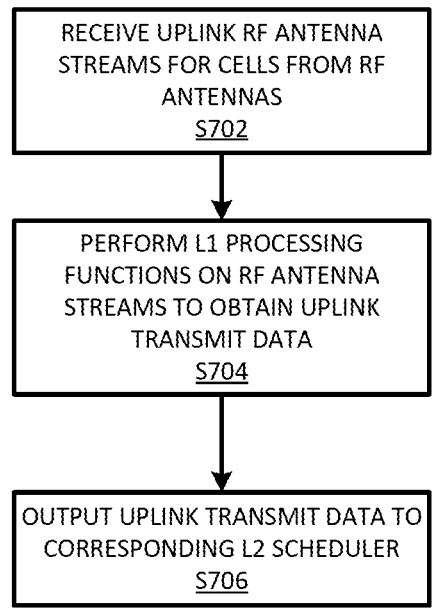
FIGS. 7 and 8 illustrate a method for scheduling uplink transmissions according to an example embodiment.
Figure 8:
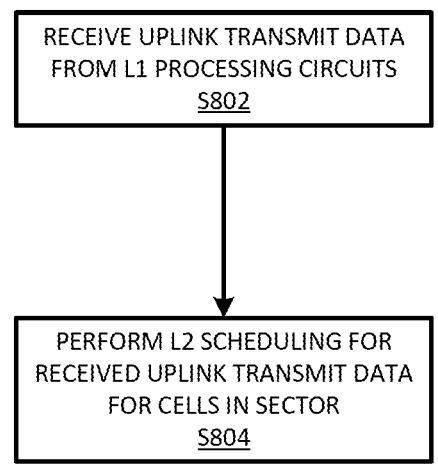

FIGS. 7 and 8 are flow charts illustrating a method for scheduling uplink transmit data. FIGS. 7 and 8 also describe example functionality/operation of the L1/L2 processing board 202-1 shown in FIGS. 1 and 4 when the data transmission flow is in the uplink direction (i.e., from user to base station, etc.).

Referring to FIG. 7, at step S702 the L1 processing circuit 2020-1 receives one or more RF antenna streams for users in cells CELL1, CELL4, and CELL7 on carrier C1. In one example, the one or more RF antenna streams include uplink transmit data from users in cells CELL1, CELL4, and CELL7. The uplink transmit data includes control information or messages for scheduling uplink transmissions received on an uplink control channel, as well as payload data received on an uplink data channel.

At step S704, the L1 processing circuit 2020-1 performs L1 processing functions on the received one or more RF antenna streams. In one example, the L1 processing circuit 2020-1 de-modulates and decodes the received RF antenna streams to recover one or more bit sequences sent by users in cells CELL1, CELL4 and CELL7 on the uplink data channel. The L1 processing circuit 2020-1 also decodes CQI and Ack/Nack messages on the uplink control channel for users in cells CELL1, CELL4 and CELL7. The decoded information obtained by the L1 processing circuit 2020-1 may also be referred to herein as uplink control and transmit data.

At step S706, the L1 processing circuit 2020-1 outputs the uplink control and transmit data for the cells CELL1, CELL4 and CELL7 to one of the local L2 scheduler 2022-1, the remote L2 scheduler 2022-2 and the remote L2 scheduler 2022-3 based on the sectors in which the cells are located. In one example, the L1 processing circuit 2020-1 outputs the uplink control and transmit data for cell CELL1 in sector S1 to the local L2 scheduler 2022-1; the L1 processing circuit 2020-1 outputs the uplink control and transmit data for cell CELL4 in sector S2 to the remote L2 scheduler 2022-2; and the L1 processing circuit 2020-1 outputs the uplink control and transmit data for cell CELL7 in sector S3 to the remote L2 scheduler 2022-3.

Although not specifically discussed herein, each of the L1 processing circuits 2020-2 and 2020-3 operates in the same or substantially the same manner as discussed above with regard to FIG. 7.

For example, at step S704 the L1 processing circuit 2020-2 performs L1 processing functions on RF antenna streams for users in cells CELL2, CELL5, and CELL8 on carrier C2, and the L1 processing circuit 2020-3 performs L1 processing functions on RF antenna streams for users in cells CELL3, CELL6, and CELL9 on carrier C3.

At step S706, the L1 processing circuit 2020-2 outputs the uplink control and transmit data for cell CELL2 to the L2 scheduler 2022-1, outputs the uplink control and transmit data for cell CELL5 to the L2 scheduler 2022-2, and outputs the uplink control and transmit data for cell CELL8 to the L2 scheduler 2022-3. The L1 processing circuit 2020-3 outputs the processed uplink control and transmit data for cell CELL3 to the L2 scheduler 2022-1, outputs the processed uplink control and transmit data for cell CELL6 to the L2 scheduler 2022-2, and outputs the uplink control and transmit data for cell CELL9 to the L2 scheduler 2022-3.

Turning now to FIG. 8, at step S802 the L2 scheduler 2022-1 receives the uplink control and transmit data for all cells in sector S1 from the L1 processing circuits 2020-1, 2020-2, and 2020-3.

In more detail, at step S802 the L2 scheduler 2022-1 receives uplink control and transmit data for cell CELL1 on carrier C1 from the local L1 processing circuit 2020-1; the L2 scheduler 2022-1 receives uplink control and transmit data for cell CELL2 on carrier C2 from the remote L1 processing circuit 2020-2; and the L2 scheduler 2022-1 receives processed uplink control and transmit data for cell CELL3 on carrier C3 from remote L1 processing circuit 2020-3.

The uplink control and transmit data for cell CELL1 on carrier C1 is input to the anchor cell scheduler 3022-1, the uplink control and transmit data for cell CELL2 on carrier C2 is input to the first secondary cell scheduler 3022-2, and the uplink control and transmit data for cell CELL3 on carrier C3 is input to the second secondary cell scheduler 3022-3.

At step S804, the L2 scheduler 2022-1 performs L2 scheduling operations for cells CELL1, CELL2 and CELL3 in sector S1. For example, the L2 scheduler 2022-1 collects uplink control and transmit information for cells CELL1, CELL2 and CELL3 in sector S1, and generates uplink scheduling information for cells CELL1, CELL2 and CELL3 in sector S1. The L2 scheduler 2022-1 outputs the uplink scheduling information to the RNC 210 for further processing and transmission of data on the uplink. The uplink scheduling information may also be referred to as uplink control and transmit information.

In more detail, at step S804 the L2 scheduler 2022-1 extracts information from the received bit sequences. The L2 scheduler 2022-1 then sends the processed control information to the RNC 210.

The L2 scheduler 2022-1 also monitors downlink channel quality by receiving and analyzing CQI and Ack/Nack signaling to determine the channel quality and data error for a last downlink transmission. In another example, the L2 scheduler 2022-1 may monitor uplink channel quality in a similar manner.

By combining CQI, Ack/Nack, bit error rate and other control information, the L2 scheduler 2022-1 determines next scheduling actions, such as maintaining current state of operation, requesting user retransmission, adjusting channel power, removing the channel, etc.

Still referring to FIG. 8, in more detail with regard to step S804 the anchor cell scheduler 3022-1 performs uplink L2 scheduling operations for cell CELL1, the first secondary cell scheduler 3022-2 performs uplink L2 scheduling operations for cell CELL2, and the second secondary cell scheduler 3022-3 performs uplink L2 scheduling operations for cell CELL3.

Although not specifically discussed herein, each of the L2 schedulers 2022-2 and 2022-3 may operate in the same or substantially the same manner as discussed above with regard to FIG. 8.

For example, at step S802 the L2 scheduler 2022-2 receives uplink transmit data for cell CELL4 on carrier C1 from the L1 processing circuit 2020-1; the L2 scheduler 2022-2 receives uplink transmit data for cell CELL5 on carrier C2 from the L1 processing circuit 2020-2; and the L2 scheduler 2022-2 receives uplink transmit data for cell CELL6 on carrier C3 from remote L1 processing circuit 2020-3. The L2 scheduler 2022-3 receives uplink transmit data for cell CELL7 on carrier C1 from the L1 processing circuit 2020-1; the L2 scheduler 2022-3 receives uplink transmit data for cell CELL8 on carrier C2 from the L1 processing circuit 2020-2; and the L2 scheduler 2022-3 receives uplink transmit data for cell CELL9 on carrier C3 from remote L1 processing circuit 2020-3.

At step S804, the L2 scheduler 2022-2 performs uplink L2 scheduling operations for cells CELL4, CELL5 and CELL6 in sector S2 and the L2 scheduler 2022-3 performs uplink L2 scheduling operations for cells CELL7, CELL8 and CELL9 in sector S3 in the same or substantially the same manner as discussed above with regard to FIG. 8. The L2 schedulers 2022-2 2022-3 then output the uplink scheduling information to the RNC 210.

The multi-board architecture described herein enables multiple L1/L2 processing boards at a NodeB to be viewed together as a system, thereby distributing RF antenna streams and 3GPP feature sets among multiple L1/L2 processing boards at the NodeB.

The multi-board architecture according to one or more example embodiments may reduce unnecessary resource consumption at a NodeB by decreasing duplicated functionality present in the conventional single board architecture. In one example, the L1/L2 processing boards process only a portion or fraction of the antenna streams as compared to the conventional single board architecture.

Example embodiments may also extend the life cycle of existing boards and provide for the ability to add additional 3GPP features to existing boards.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A transceiver station providing wireless resources for cells on a plurality of carriers in a geographical coverage area, the geographical coverage area being divided into a plurality of sectors, the transceiver station comprising:
    a first board including,
        a first L1 processing circuit configured to perform L1 processing functions on at least one of radio frequency antenna streams and downlink transmit data for users in cells on only a first subset of the plurality of carriers, and
        a first scheduler configured to schedule at least one of uplink and downlink transmissions for cells on the plurality of carriers in only a first subset of the plurality of sectors; and
    a second board interconnected with the first board, the second board including,
        a second L1 processing circuit configured to perform L1 processing functions on at least one of radio frequency antenna streams and downlink transmit data for users in cells on only a second subset of the plurality of carriers, the first subset of the plurality of carriers being different from the second subset of the plurality of carriers, and
        a second scheduler configured to schedule at least one of uplink and downlink transmissions for cells on the plurality of carriers in only a second subset of the plurality of sectors.

2. The transceiver station of claim 1, wherein the first scheduler is further configured to,
    generate downlink scheduling information for cells on the plurality of carriers in only the first subset of the plurality of sectors, and output the downlink scheduling information and scheduled downlink transmission data to the second L1 processing circuit.

3. The transceiver station of claim 2, wherein the second L1 processing circuit is further configured to,
generate at least one radio frequency antenna stream based on the downlink scheduling information and the scheduled downlink transmission data, and
output the generated at least one radio frequency antenna stream to a radio frequency antenna for transmission to users in cells on only the second subset of the plurality of carriers.

4. The transceiver station of claim 1, wherein the first L1 processing circuit is further configured to,
obtain uplink control and transmit data for users in cells on only the first subset of the plurality of carriers based on the radio frequency antenna streams, and
output the obtained uplink control and transmit data to the second scheduler.

5. The transceiver station of claim 4, wherein the second scheduler is configured to,
collect uplink control and transmit data for users in cells in only the second subset of the plurality of sectors, the collected uplink control and transmit data including the obtained uplink control and transmit data output from the first L1 processing circuit,
generate uplink control and transmit information for the cells in only the second subset of the plurality of sectors, and
output the generated uplink control and transmit information to a radio network controller.

6. The transceiver station of claim 1, wherein the first subset of the plurality of sectors is different from the second subset of the plurality of sectors.

7. The transceiver station of claim 1, wherein each carrier in the first subset of the plurality of carriers is different from each carrier in the second subset of the plurality of carriers.

8. The transceiver station of claim 1, wherein each sector in the first subset of the plurality of sectors is different from each sector in the second subset of the plurality of sectors.

9. A transceiver station providing wireless resources for cells on a plurality of carriers in a geographical coverage area, the geographical coverage area being divided into a plurality of sectors, the transceiver station comprising:
a first board including,
a first L1 processing circuit configured to perform L1 processing functions on at least one of radio frequency antenna streams and downlink transmit data for users in cells on only a first subset of the plurality of carriers,
a first scheduler configured to schedule at least one of uplink and downlink transmissions for cells on the plurality of carriers in only a first subset of the plurality of sectors; and
a second board interconnected with the first board, the second board including,
a second L1 processing circuit configured to perform L1 processing functions on at least one of radio frequency antenna streams and downlink transmit data for users in cells on only a second subset of the plurality of carriers, and
a second scheduler configured to schedule at least one of uplink and downlink transmissions for cells on the plurality of carriers in only a second subset of the plurality of sectors;
wherein the first scheduler includes
an anchor cell scheduler configured to schedule at least one of uplink and downlink transmissions for cells on the first subset of the plurality of carriers in the first subset of the plurality of sectors, and
a secondary scheduler configured to schedule at least one of uplink and downlink transmissions for cells on the second subset of the plurality of carriers in the first subset of the plurality of sectors.

10. A transceiver station providing wireless resources for cells on a plurality of carriers in a geographical coverage area, the geographical coverage area being divided into a plurality of sectors, the transceiver station comprising:
a first board including a L1 processing circuit configured to perform L1 processing functions on at least one of radio frequency antenna streams and downlink transmit data for users in the cells on a per-carrier basis; and
a second board including a scheduler configured to schedule at least one of uplink and downlink transmissions for the cells on a per-sector basis, the second board being separate from, but interconnected with the first board; wherein
the L1 processing circuit is further configured to perform L1 processing functions on the at least one of the radio frequency antenna streams and the downlink transmit data for users in the cells on only a first subset of the plurality of carriers, the first subset of the plurality of carriers being different from at least one other subset of the plurality of carriers on which L1 processing functions are performed at at least one other board at the transceiver station.

11. The transceiver station of claim 10, wherein the scheduler is configured to schedule at least one of uplink and downlink transmissions for users in cells on the plurality of carriers in only a first subset of the plurality of sectors.

12. The transceiver station of claim 11, wherein the scheduler is further configured to,
generate downlink scheduling information for the users in the cells in only the first subset of the plurality of sectors, and
output the downlink scheduling information and scheduled downlink transmission data to the L1 processing circuit.

13. The transceiver station of claim 12, wherein the L1 processing circuit is further configured to,
generate at least one radio frequency antenna stream based on the downlink scheduling information and the scheduled downlink transmission data, and
output the generated at least one radio frequency antenna stream to a radio frequency antenna for transmission to the users in the cells on only the first subset of the plurality of carriers.

14. The transceiver station of claim 11, wherein the L1 processing circuit is further configured to,
obtain uplink control and transmit data for the users in the cells on only the first subset of the plurality of carriers based on the radio frequency antenna streams, and
output the obtained uplink control and transmit data to the scheduler.

15. The transceiver station of claim 14, wherein the scheduler is configured to,
collect uplink control and transmit data for the users in the cells in only the first subset of the plurality of sectors, the collected uplink control and transmit data including the obtained uplink control and transmit data, generate uplink control and transmit information for the cells in only the first subset of the plurality of sectors, and output the generated uplink control and transmit information to a radio network controller.

16. A transceiver station providing wireless resources for cells on a plurality of carriers in a geographical coverage area, the geographical coverage area being divided into a plurality of sectors, the transceiver station comprising:

a first board including a L1 processing circuit configured to perform L1 processing functions on at least one of radio frequency antenna streams and downlink transmit data for users in the cells on a per-carrier basis; and a second board including a scheduler configured to schedule at least one of uplink and downlink transmissions for the cells on a per-sector basis, the second board being separate from, but interconnected with the first board;

wherein the scheduler is configured to schedule at least one of uplink and downlink transmissions for users in cells on the plurality of carriers in only a first subset of the plurality of sectors; and wherein the scheduler includes an anchor cell scheduler configured to schedule at least one of uplink and downlink transmissions for the cells on the first subset of the plurality of carriers in the first subset of the plurality of sectors, and a secondary scheduler configured to schedule at least one of uplink and downlink transmissions for cells on a second subset of the plurality of carriers in the first subset of the plurality of sectors.

17. A method for scheduling transmissions at a transceiver station providing wireless resources for cells on a plurality of carriers in a geographical coverage area, the geographical coverage area being divided into a plurality of sectors, the method comprising:

performing, at a first board at the transceiver station, L1 processing functions on at least one of radio frequency antenna streams and downlink transmit data for users in the cells on a per-carrier basis; and scheduling, at a second board at the transceiver station, at least one of uplink and downlink transmissions for the cells on a per-sector basis;

wherein the performing step includes performing L1 processing functions on the at least one of the radio frequency antenna streams and the downlink transmit data for users in the cells on only a first subset of the plurality of carriers, the first subset of the plurality of carriers being different from at least one other subset of the plurality of carriers on which L1 processing functions are performed at at least one other board at the transceiver station.

18. The method of claim 17, wherein the scheduling step includes:

scheduling at least one of uplink and downlink transmissions for users in cells on the plurality of carriers in only a first subset of the plurality of sectors.

* * * * *